A. A. PUDDEFOOT.
FENDER FOR VEHICLE WHEELS.
APPLICATION FILED MAY 29, 1911.
1,126,861.
Patented Feb. 2, 1915.
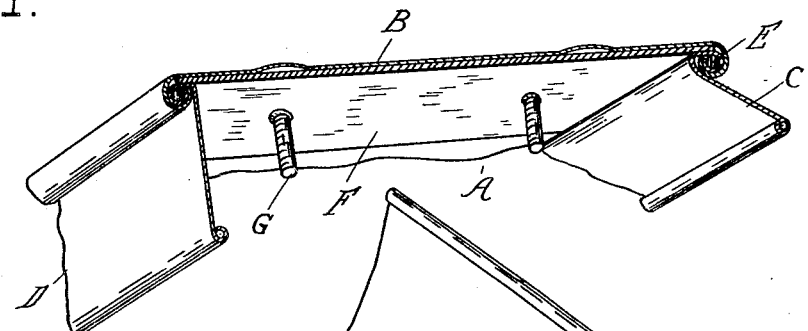
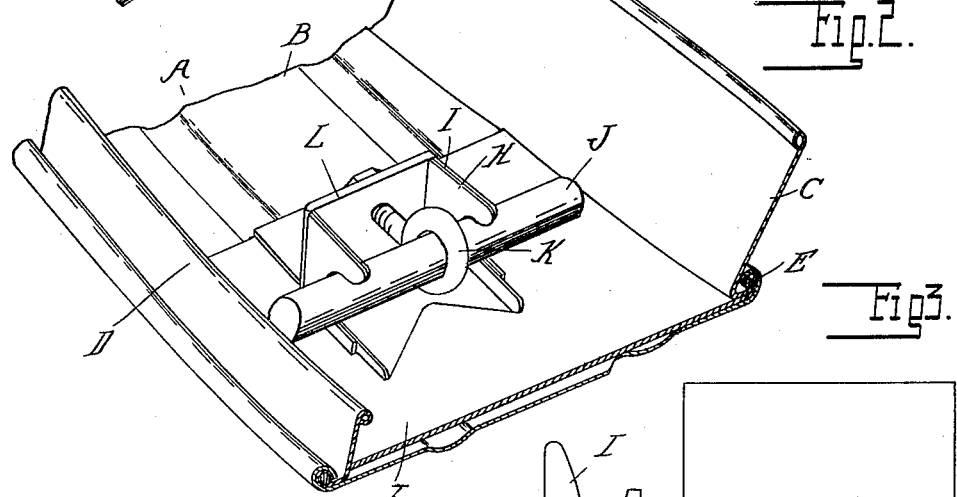
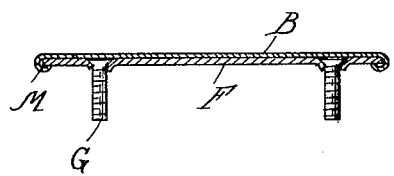
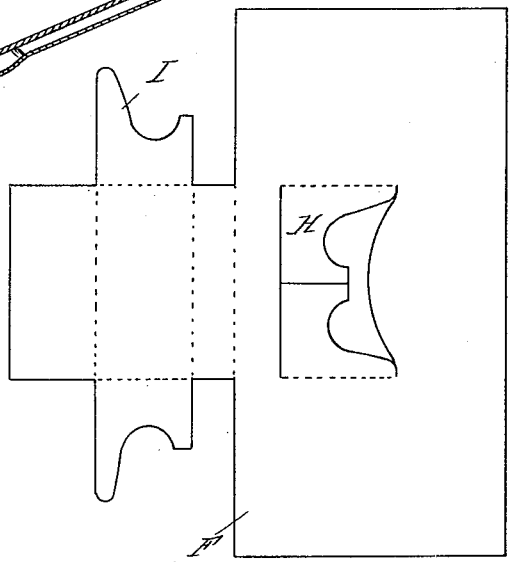
Witnesses
H. H. Ford
H. H. Belknap
Inventor
Alfred A. Puddefoot
By Whittemore Hulbert + Whittemore
Atty's

UNITED STATES PATENT OFFICE.

ALFRED A. PUDDEFOOT, OF DETROIT, MICHIGAN, ASSIGNOR TO BRISCOE MANUFACTURING COMPANY, OF DETROIT, MICHIGAN, A CORPORATION OF MICHIGAN.

FENDER FOR VEHICLE-WHEELS.

1,126,861.  Specification of Letters Patent.  Patented Feb. 2, 1915.

Application filed May 29, 1911. Serial No. 630,174.

*To all whom it may concern:*

Be it known that I, ALFRED A. PUDDEFOOT, a citizen of the United States of America, residing at Detroit, in the county of Wayne and State of Michigan, have invented certain new and useful Improvements in Fenders for Vehicle-Wheels, of which the following is a specification, reference being had therein to the accompanying drawings.

The invention relates to mud guards or fenders for vehicle wheels and more particularly for motor vehicles, and the invention consists in the novel construction as hereinafter set forth.

In the drawings,—Figure 1 is a sectional perspective view of a vehicle fender to which my improvement is applied; Fig. 2 is a similar view showing a modified construction; Fig. 3 is a plan of the blank from which the construction shown in Fig. 2 is struck-up; Fig. 4 is a cross section through a modified construction.

In the present state of the heart it is usual to form mud guards or fenders of sheet metal and to secure them in position by supporting arms or brackets which are directly riveted or bolted to the sheet metal of the fender. With such constructions, the metal at the point of attachment is subjected to considerable stress and vibration with the result that the rivets or bolts are frequently broken out. Furthermore, the sheet metal at the point of attachment being of the same gage as in all other parts of the fender supported thereby, it is easily bent out of shape. My invention is designed to overcome this defect by providing a reinforcement for the sheet metal of the fender at the point of attachment to the securing bracket, and further by attaching the bracket to this reinforcement. Thus the advantages above set forth are secured, together with the further advantage that no rivet or bolt heads are exposed on the finished surface of the fender, which avoids the marring of said surface.

In detail, A is a sheet metal fender which is provided with a top portion B extending over the periphery of the wheel, and flange portions C and D on opposite sides thereof, forming respectively the apron and rim. The portion B is secured to the portions C and D by suitable seaming, preferably strengthened by the insertion of a rod or wire E therein.

F is the reinforcing and attachment member which is formed preferably of a heavier gage of metal and extends across the under face of the peripheral portion B of the guard. The opposite ends of this reinforcement may be secured in any suitable manner such as by insertion in the seam between the top B and the metal of the flanges C and D. To this reinforcing member a supporting bracket or fender fastener is attached, and as shown in Fig. 1 the attachment means employed comprises a pair of screw studs G headed or riveted into the metal of the reinforcement and extending donward therefrom. These screws may then be engaged with suitable apertures in the supporting bracket (not shown).

As shown in Fig. 2 a clamping device is used for attaching the fender to its support. This consists of a bearing for engaging the shank of the supporting bracket preferably formed of struck up portions H of the reinforcement member F and folded reinforcement members I which together form a U-shaped structure having concave bearings in its parallel sides.

J is a shank of the supporting bracket and K is an eye bolt threaded upon said shank and having its threaded end passing through the flange L of the struck up portion. The arrangement is such that by tightening a nut upon the eye-bolt the shank J is drawn into locking engagement with the bearings in the struck up portion, and thus forms a secure attachment between the bracket and fender.

With either of the constructions described, the fender proper will be firmly supported by the reinforcement F preventing the bending or breaking out of the metal and also avoiding the marring of the finish.

The advantage of avoiding passing the rivets through the finished surface of the fender is that it is the almost universal practice to finish such structures by japanning. The slightest projection or unevenness in the metal will interrupt the flow of the liquid material, causing a mar in the finish.

In certain constructions of fender, the apron and rim flanges are omitted as illustrated in Fig. 4. With such structures the reinforcement may be attached by turning under a clamping bead as indicated at M, or by any other suitable means of marginal attachment.

What I claim as my invention is:

A vehicle fender comprising a peripheral portion, flanges extending from the opposite edges thereof, a reinforcement member extending across the under face of the peripheral portion and engaging the seam between said portion and the flange portions, and means for attaching the fender support to said reinforcement member.

In testimony whereof I affix my signature in presence of two witnesses.

ALFRED A. PUDDEFOOT.

Witnesses:
JAMES A. HOLIHAN,
H. R. JACK.

Copies of this patent may be obtained for five cents each, by addressing the "Commissioner of Patents, Washington, D. C."